(12) United States Patent
Sugiyama et al.

(10) Patent No.: US 6,915,870 B2
(45) Date of Patent: Jul. 12, 2005

(54) ANTISTATIC STRUCTURE OF FUEL PIPE

(75) Inventors: Mitsuo Sugiyama, Saitama (JP);
Yasuhiro Hasegawa, Saitama (JP);
Toru Ogawa, Saitama (JP); Hidekazu Nobata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/077,069

(22) Filed: Feb. 15, 2002

(65) Prior Publication Data
US 2002/0125378 A1 Sep. 12, 2002

(30) Foreign Application Priority Data

Feb. 26, 2001 (JP) ..................................... P. 2001-050787

(51) Int. Cl.⁷ ............................................. B60K 15/01
(52) U.S. Cl. ..................... 180/69.4; 248/68.1; 248/74.2
(58) Field of Search .............................. 180/69.4, 69.5; 248/68.1, 74.1, 74.2

(56) References Cited

U.S. PATENT DOCUMENTS

| 4,705,244 A | * | 11/1987 | Saotome et al. ........... 248/68.1 |
| 5,184,794 A | * | 2/1993 | Saito ......................... 248/68.1 |
| 5,588,683 A | * | 12/1996 | Schliessner ................ 248/68.1 |
| 5,613,655 A | * | 3/1997 | Marion ...................... 248/68.1 |
| 5,653,411 A | * | 8/1997 | Picco et al. ................ 248/74.1 |
| 5,703,330 A | * | 12/1997 | Kujawski .................... 248/68.1 |
| 5,772,160 A | * | 6/1998 | Gordon ...................... 248/68.1 |
| 5,785,285 A | * | 7/1998 | Gordon ...................... 248/68.1 |
| 5,947,426 A | * | 9/1999 | Kraus ......................... 248/68.1 |
| 6,036,145 A | * | 3/2000 | Calabrese et al. ......... 248/68.1 |
| 6,070,836 A | * | 6/2000 | Battie et al. ............... 248/68.1 |
| 6,089,513 A | * | 7/2000 | Cau et al. .................. 248/68.1 |
| 6,152,406 A | * | 11/2000 | Denndou ................... 248/68.1 |
| 6,206,330 B1 | * | 3/2001 | Oi et al. .................... 248/68.1 |
| 6,241,198 B1 | * | 6/2001 | Maruyama ................. 248/68.1 |
| 6,290,201 B1 | * | 9/2001 | Kanie et al. ............... 248/68.1 |
| 6,450,459 B2 | * | 9/2002 | Nakanishi .................. 248/68.1 |
| 6,565,049 B2 | * | 5/2003 | Hahn ......................... 248/68.1 |

FOREIGN PATENT DOCUMENTS

| EP | 1 122 477 A2 | 8/2001 |
| JP | 05-246322 | 9/1993 |
| JP | 08-053014 | 2/1996 |
| JP | 11-324840 A | 11/1999 |
| JP | 2000-104639 A | 4/2000 |
| JP | 2000-266240 A | 9/2000 |
| JP | 2000266240 | 9/2000 |
| JP | 2002-138918 A | * | 5/2002 |
| JP | 2002-250477 A | * | 9/2002 |

* cited by examiner

*Primary Examiner*—Christopher P. Ellis
*Assistant Examiner*—Jeff Restifo
(74) *Attorney, Agent, or Firm*—Carrier, Blackman & Associates, P.C.; Joseph P. Carrier; William D. Blackman

(57) ABSTRACT

In an antistatic structure of a fuel pipe, the fuel pipe to be charged in contact with a fuel, and a brake pipe connected electrically to a vehicle body are coupled to each other through a conductive clamp in at least one portion.

19 Claims, 4 Drawing Sheets

ANTISTATIC STRUCTURE OF FUEL PIPE

BACKGROUND OF THE INVENTION

1. Field of the Invention

The present invention relates to an antistatic structure for preventing a fuel pipe from being charged in contact with a fuel that has been charged by friction with a fuel pipe or a strainer.

2. Description of the Related Art

A fuel tank for an automobile is provided with a strainer for removing foreign matters in a fuel and various pipes such as a feed pipe, a return pipe, and a vent pipe. The feed pipe feeds a fuel to an injector of an engine. The return pipe returns, to a fuel tank, an excess fuel which is not jetted from the injector in the engine. The vent pipe is connected to a filler tube at an upper space of the fuel tank so as not to prevent the injection of the fuel from the filler tube to the fuel tank. If the fuel is charged by friction when flowing in the pipes or the strainer, the pipes are charged in contact with the fuel. If the pipes are thus charged, a difference in potential might be made between the body side and the pipes to generate a discharge.

JP-A-2000-266240 has described such a structure that pipes such as a fuel pipe, a brake pipe, a power steering pipe and a lubricating oil pipe are collectively supported on a piping holding portion formed of a conductive resin and the piping holding portion is fixed to a vehicle body through a bracket and a bolt which are formed of a metal, thereby transferring electric charges accumulated in the pipes to the vehicle body.

However, there has conventionally been a problem in that a special member such as the bracket or the bolt is required for fixing the piping holding portion formed of the conductive resin to the vehicle body in the state of electrical connection, resulting in an increase in the number of parts.

SUMMARY OF THE INVENTION

In consideration of the circumstances, it is an object of the invention to remove electric charges from a fuel pipe charged in contact with a fuel by using a simple structure.

In order to attain the object, a first aspect of the invention is directed to an antistatic structure of a fuel pipe wherein the fuel pipe to be charged in contact with a fuel, and a pipe connected electrically to a vehicle body are coupled to each other through a conductive clamp in at least one portion.

According to the structure described above, the fuel pipe and the pipe are coupled to each other through the conductive clamp in at least one portion. Therefore, it is possible to transfer the electric charges of the fuel pipe charged in contact with a fuel to the body through the conductive clamp and the pipe. Consequently, it is possible to suppress the generation of a great discharge, thereby preventing a deterioration in the fuel pipe. Moreover, the pipe is originally connected electrically to the body. Therefore, a special member for electrically connecting the conductive clamp to the body is not required so that the number of parts and cost can be reduced.

In addition to the structure according to the first aspect of the invention, moreover, a second aspect of the invention is directed to the antistatic structure of a fuel pipe, wherein the conductive clamp couples portions of the fuel pipe and the pipe that are disposed close to each other in parallel.

According to the structure described above, the portions in which the fuel pipe and the pipe are provided close to each other in parallel are connected through the conductive clamp. Therefore, the conductive clamp can have a small and simple structure.

In addition to the structure according to the first aspect of the invention, furthermore, a third aspect of the invention is directed to the antistatic structure of a fuel pipe, wherein the pipe is a brake pipe, and the brake pipe is electrically connected to the vehicle body through a bracket for supporting a connecting portion to a brake hose.

According to the structure described above, the brake pipe is electrically connected to the vehicle body through a bracket for supporting a connecting portion to a brake hose. Therefore, a special member for electrically connecting the brake pipe to the body is not required so that the number of parts and cost can be reduced.

In addition to the structure according to the first aspect of the invention, moreover, a fourth aspect of the invention is directed to the antistatic structure of a fuel pipe according to the first aspect of the invention, wherein the conductive clamp is constituted by a synthetic resin including carbon black.

According to the structure described above, the conductive clamp is constituted by a synthetic resin including carbon black. Therefore, it is possible to cause the conductive clamp to have a flexibility to easily clamp the fuel pipe and the pipe, and furthermore, to reliably carry out electrical conduction between the fuel pipe and the pipe.

A feed pipe 12 and a return pipe 13 according to an embodiment corresponds to the fuel pipe according to the invention and a wall portion 22 according to the embodiment corresponds to the body according to the invention.

DETAILED DESCRIPTION OF THE PREFERRED EMBODIMENTS

An embodiment of the invention will be described below based on an embodiment of the invention shown with reference FIGS. 1 to 4.

Figure 1:
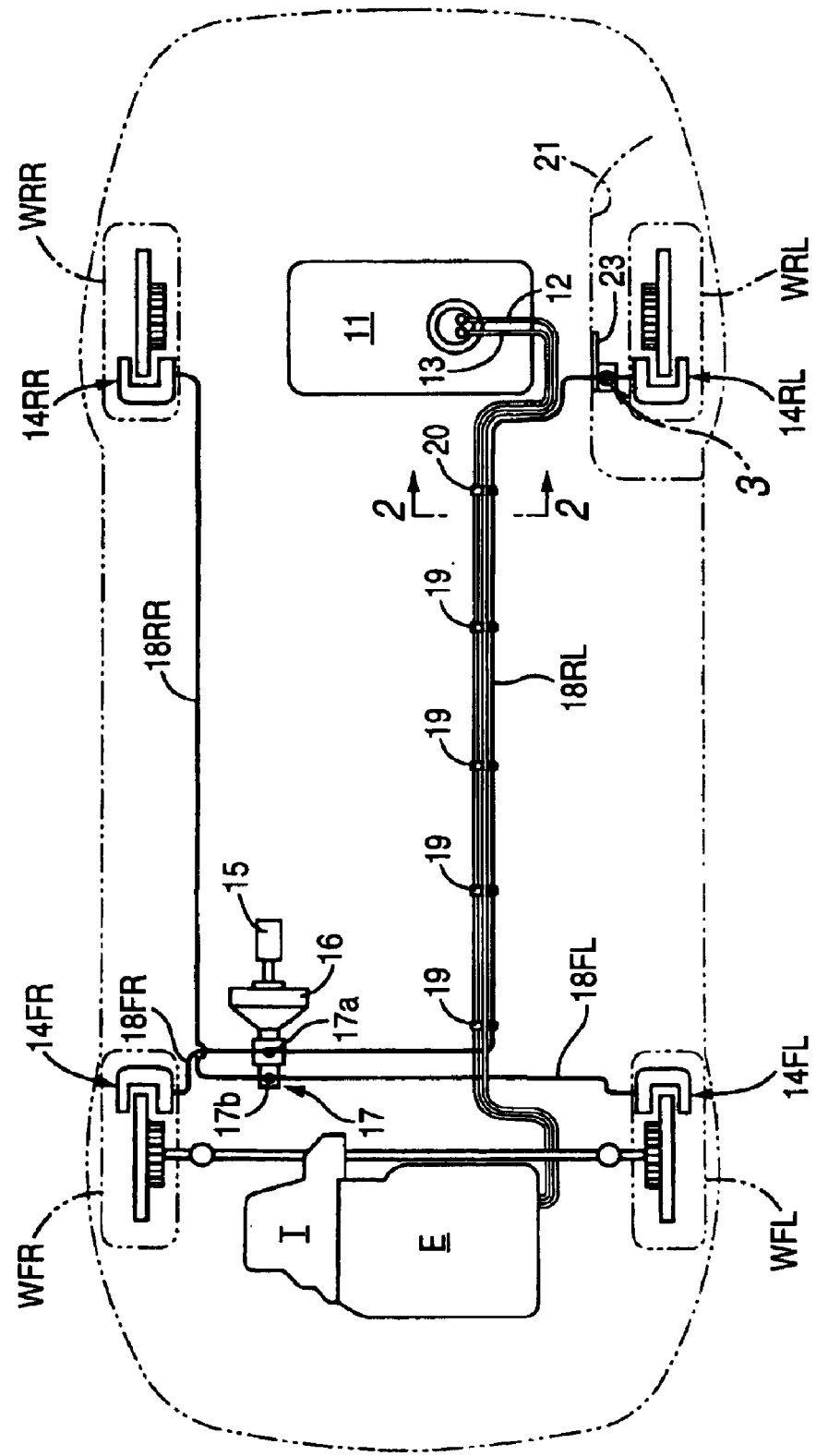
FIG. 1 is a schematic view showing a fuel feeding system and a brake system in an automobile.

As shown in FIG. 1, a fuel tank 11 is mounted on a rear part of a vehicle body of a vehicle, and the fuel tank 11 and an engine E mounted on the front part of the body are connected to each other through a feed pipe 12 and a return pipe 13. The feed pipe 12 for feeding a fuel to the engine E has an upstream end connected to a strainer and a fuel pump which are provided in the fuel tank 11 and are not shown, and a downstream end connected to an injector which is provided in the engine E and is not shown. The return pipe 13 for returning an excess fuel from the engine E to the fuel tank 11 has an upstream end connected to the injector and a downstream end connected to the upper space of the fuel tank 11.

Brake calipers 14FL, 14FR, 14RL and 14RR are provided on left and right front wheels WFL and WFR to be driving wheels connected to the engine E through a transmission T and left and right rear wheels WRL and WRR to be driven wheels which rotate with the running of the vehicle, respectively. A tandem type master cylinder 17 to be operated by a brake pedal 15 through a vacuum booster 16 has a first port 17a connected to the brake caliper 14FR of the right front wheel WFR and the brake caliper 14RL of the left rear wheel WRL through two brake pipes 18FR and 18RL, and a second port 17b connected to the brake caliper 14FL of the left front wheel WFL and the brake caliper 14RR of the right rear wheel WRR through two brake pipes 18FL and 18RR.

The three pipes, that is, the feed pipe 12, the return pipe 13 and the brake pipe 18RL of the left rear wheel WRL are arranged close to each other in parallel and extends in a longitudinal direction along the lower surface of the floor of the vehicle in this state. The three pipes 12, 13 and 18RL are put together through a plurality of (five in the embodiment) clamps 19 . . . and 20. While the four clamps 19 . . . are constituted by a general synthetic resin which is not conductive, one conductive clamp 20 is constituted by a conductive synthetic resin containing carbon black.

Figure 2:
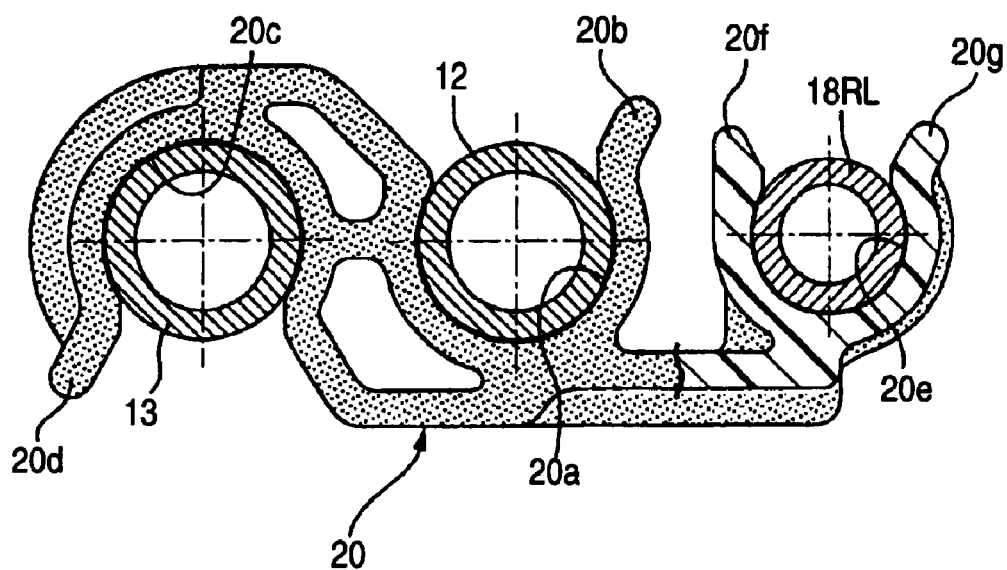
FIG. 2 is an enlarged view taken along in a line 2—2 of FIG. 1.

As shown in FIG. 2, the conductive clamp 20 fixes the feed pipe 12 to be fitted in a concave portion 20a formed on a center with an elastic attachment piece 20b, fixes the return pipe 13 to be fitted in a concave portion 20c formed on one end side with an elastic attachment piece 20d, and fixes the brake pipe 18RL to be fitted in a concave portion 20e formed on the other end side with a pair of elastic attachment pieces 20f and 20g. Accordingly, the feed pipe 12, the return pipe 13 and the brake pipe 18RL are electrically conducted mutually through the conductive clamp 20.

Figure 3:
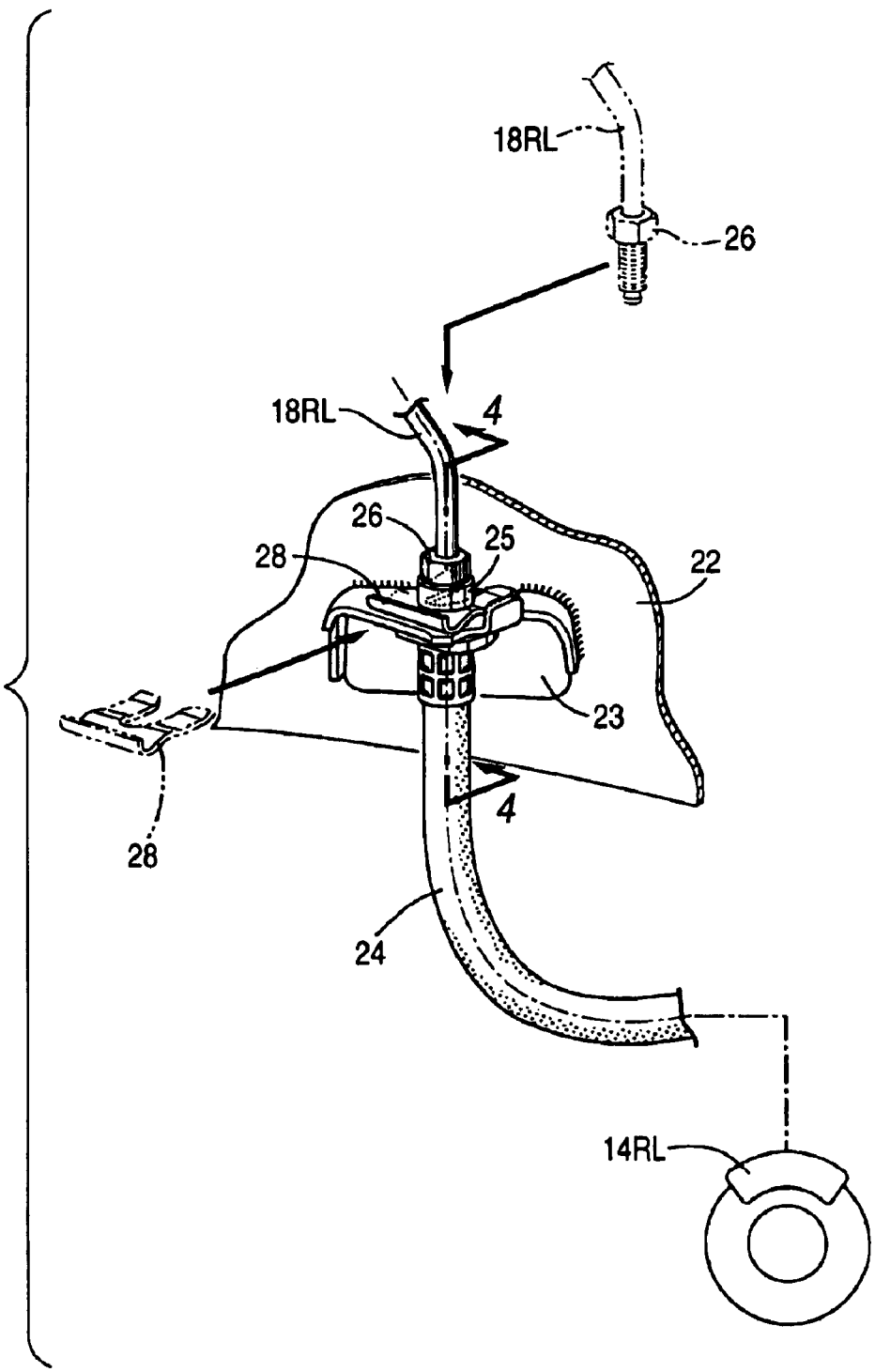
FIG. 3 is an enlarged view seen from a direction 3 of FIG. 1.
Figure 4:
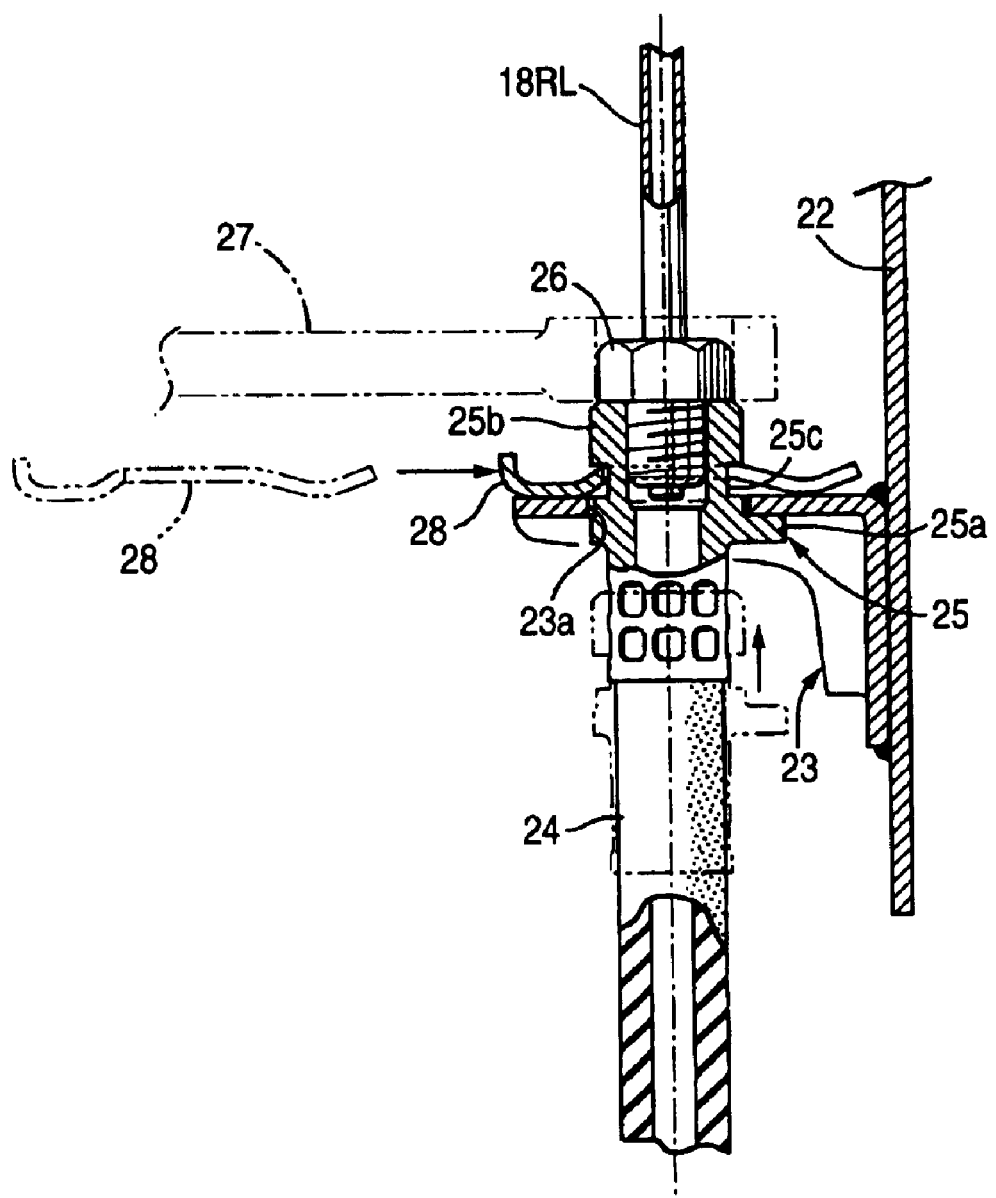
FIG. 4 is a sectional view taken along a line 4—4 of FIG. 3.

As is apparent from FIGS. 1, 3 and 4, a bracket 23 is welded to a wall portion 22 of a wheel well 21 of the left rear wheel WRL. A hose fixture 25 is provided on one of ends of a flexible brake hose 24 having the other end coupled to the brake caliper 14RL, and a groove portion 25c formed between a lower flange 25a and an upper flange 25b in the hose fixture 25 is loosely fitted in an opening 23a of the bracket 23. On the other hand, a pipe fixture 26 is provided on the end of the brake pipe 18RL. The pipe fixture 26 can be threadedly fixed onto the hose fixture 25 by means of a wrench 27. Accordingly, after the pipe fixture 26 is fastened to the hose fixture 25, a clip 28 is pressed into a clearance between the lower surface of the upper flange 25b of the hose fixture 25 and the upper surface of the bracket 23 so that the hose fixture 25 can be fixed to the bracket 23. In this state, the brake pipe 18RL is electrically conducted to the wall portion 22 of the wheel well 21 through the pipe fixture 26, the hose fixture 25, the clip 28 and the bracket 23.

Actually, the brake hoses are connected to the ends of the three other brake pipes 18FL, 18FR and 18RR and the brake hoses are not shown in FIG. 1.

Next, description will be given to functions according to the embodiment of the invention having the structure described above.

When a fuel flowing in the feed pipe 12 and the return pipe 13 or in the strainer provided on the upstream side of the feed pipe is charged by friction, the feed pipe 12 and the return pipe 13 which come in contact with the fuel are charged because the fuel pipes are supported on the vehicle body in an electrically independent manner. However, the feed pipe 12 and the return pipe 13 are electrically connected to the brake pipe 18RI, through the conductive clamp 20, and furthermore, the brake pipe 18 RL is electrically connected to the wall portion 21 of the vehicle body through the bracket 23 in a connecting portion to the brake pipe 24. Therefore, it is possible to transfer electric charges accumulated in the feed pipe 12 and the return pipe 13, thereby reliably eliminating the electric charges.

Consequently, it is possible to reliably prevent a great discharge from being generated due to a gradual increase in the amount of charging and to prevent the feed pipe 12 and the return pipe 13 from being deteriorated due to the discharge. Thus, a durability of pipes can be enhanced. In addition, the conductive clamp 20 can be deformed elastically. Therefore, the change of positions of the feed pipe 12, the return pipe 13 and the brake pipe 18RL and vibrations thereof can be absorbed effectively, and furthermore, each of the pipes 12, 13 and 18RL can easily be inserted into the conductive clamp 20, so that a contact failure is seldom caused. Moreover, the conductive clamp 20 can be electrically connected to the vehicle body by utilizing the brake pipe 18RL and the bracket 23 which is previously provided to support the end of the brake pipe 18RL on the vehicle body. Consequently, it is not necessary to specially provide a member for electrically connecting the conductive clamp 20 to the body, so that the number of parts can be reduced. Furthermore, the conductive clamp 20 clamps portions in which the feed pipe 12, the return pipe 13 and the brake pipe 18RL are arranged close to each other in parallel. Therefore, the conductive clamp 20 can have a small and simple structure.

While the embodiment of the invention has been described above in detail, the invention can be variously designed and changed without departing from the scope thereof.

For example, while the feed pipe 12 and the return pipe 13 are electrically connected to the vehicle body by utilizing the brake pipe 18RL communicating with the brake caliper 14RL of the left rear wheel WRL in the embodiment, any of the brake pipes 18FL, 18FR and 18RR may be utilized. Although only one conductive clamp 20 has been used in the embodiment, it is more effective that two or more conductive clamps 20 are used to prevent a contact failure. Moreover, the shape of the conductive clamp 20 is not restricted to that of the embodiment but can be changed properly. More specifically, each pipe is not provided on one plane but can be arranged annularly. Moreover, the fuel pipe is not restricted to the feed pipe 12 and the return pipe 13 but other pipes such as a vent pipe may be used.

As described above, according to the first aspect of the invention, the fuel pipe and the brake pipe are coupled to each other through the conductive clamp in at least one portion. Therefore, it is possible to transfer the electric charges of the fuel pipe charged in contact with a fuel to the vehicle body through the conductive clamp and the brake pipe. Consequently, it is possible to suppress the generation of a great discharge, thereby preventing a deterioration in the fuel pipe. Moreover, the brake pipe is originally connected electrically to the vehicle body. Therefore, a special member for electrically connecting the conductive clamp to the body is not required so that the number of parts and cost can be reduced.

According to the second aspect of the invention, the portions in which the fuel pipe and the brake pipe are provided close to each other in parallel are connected through the conductive clamp. Therefore, the conductive clamp can have a small and simple structure.

According to the third aspect of the invention, the brake pipe is electrically connected to a vehicle body through a bracket for supporting a connecting portion to a brake hose. Therefore, a special member for electrically connecting the brake pipe to the vehicle body is not required so that the number of parts and cost can be reduced.

According to the fourth aspect of the invention, the conductive clamp is constituted by a synthetic resin containing carbon black. Therefore, it is possible to cause the conductive clamp to have a flexibility to easily clamp the fuel pipe and the brake pipe, and furthermore, to reliably carry out electrical conduction between the fuel pipe and the brake pipe.

What is claimed is:

1. An antistatic structure of a fuel pipe, comprising:
    the fuel pipe to be charged in contact with a fuel, the fuel pipe being supported on a vehicle body in an electrically independent manner;
    a second pipe connected electrically to the vehicle body; and
    a conductive clamp electrically connecting the fuel pipe with the second pipe;
    the conductive clamp being a unitary member which is flexible and formed of electrically conductive resin,
    the conductive clamp being supported by the fuel pipe and the second pipe in such a manner that the conductive clamp is separate and spaced apart from the vehicle body.

2. The antistatic structure of a fuel pipe according to claim 1, wherein the conductive clamp couples portion of the fuel pipe and the second pipe that are disposed close to each other in parallel.

3. The antistatic structure of a fuel pipe according to claim 1, wherein the second pipe is a brake pipe, and the brake pipe is electrically connected to the vehicle body through a bracket for supporting a connecting portion to a brake hose.

4. The antistatic structure of a fuel pipe according to claim 1, wherein the conductive clamp is constituted by a synthetic resin including carbon black.

5. The antistatic structure of a fuel pipe according to claim 1, wherein the fuel pipe extends between a fuel tank and an engine of the vehicle.

6. The antistatic structure of a fuel pipe according to claim 5, wherein the fuel pipe is one of a fuel feed pipe and a fuel return pipe.

7. The antistatic structure of a fuel pipe according to claim 1, wherein the conductive clamp includes electrically conductive elastic attachment portions in engagement with the fuel pipe and the second pipe.

8. The antistatic structure of a fuel pipe according to claim 1, wherein the conductive clamp electrically connects the second pipe to a plurality of fuel pipes.

9. An antistatic structure of a vehicular fuel pipe, comprising:
    the fuel pipe which is supported on a vehicle body in an electrically independent manner,
    a second pipe fixed to a the vehicle body in an electrically conductive manner; and
    a conductive clamp electrically coupling adjacent portions of the fuel pipe and the second pipe;
    the conductive clamp being a unitary member which is flexible and formed of electrically conductive resin,
    the conductive clamp being separate and spaced apart from the vehicle body.

10. The antistatic structure of a fuel pipe according to claim 9, wherein said adjacent portions of the fuel pipe and the second pipe are disposed close to each other in parallel.

11. The antistatic structure of a fuel pipe according to claim 9, wherein the second pipe is a brake pipe, and the brake pipe is electrically connected to the vehicle body through a bracket for supporting a connecting portion of the brake pipe to a brake hose.

12. The antistatic structure of a fuel pipe according to claim 9, wherein the fuel pipe is one of a fuel feed pipe and a fuel return pipe, and extends between a fuel tank and an engine of the vehicle.

13. The antistatic structure of a fuel pipe according to claim 9, wherein the conductive clamp electrically connects the second pipe to a plurality of fucl pipes.

14. The antistatic structure of a fuel pipe according to claim 9, wherein the conductive clamp includes electrically conductive elastic attachment portions in engagement with the fuel pipe and the second pipe.

15. An antistatic apparatus for use with a fuel pipe, comprising:
    the fuel pipe to be charged in contact with a fuel, the fuel pipe being supported on a vehicle body in an electrically insulating manner;
    a second pipe, the second pipe supported on the vehicle body in an electrically conducting manner; and,
    a conductive clamp electrically connecting the fuel pipe with the second pipe;
    the conductive clamp comprising a monolithic member which is generally s-shaped such that a first end of the conductive clamp has a first curved portion opening in a first direction, that a second end of the conductive clamp has a second curved portion opening in a second direction,
    wherein the first direction and the second direction are opposed,
    the fuel pipe being secured within the first curved portion, and the second pipe being secured within the second curved portion.

16. The antistatic apparatus for use with a fuel pipe of claim 15 wherein the fuel pipe comprises a fuel feed pipe and a fuel return pipe, and wherein
    the second end of the conductive clamp comprises a third curved portion opening in the second direction, the third curved portion being disposed between the first curved portion and the second curved portion,
    the feel feed pipe being secured within the first curved portion, and the fuel return pipe being secured within the third curved portion.

17. The antistatic apparatus for use with a fuel pipe of claim 15 wherein the clamp is adapted to conduct a charge from the fuel pipe to the second pipe, and wherein the charge is discharged from the second pipe at a location which is remote from the conductive clamp.

18. The antistatic apparatus for use with a fuel pipe of claim 17 wherein the second pipe is a brake pipe, and the brake pipe is electrically connected to the vehicle body through a bracket for supporting a connecting portion of the brake pipe to a brake hose, the bracket located within the vehicle at a position distant and separated from the conductive clamp, and wherein the charge is discharged from the second pipe to the vehicle body through the bracket.

19. An antistatic structure of a fuel pipe, comprising:
    the feel pipe to be charged in contact with a fuel, the fuel pipe being supported on a vehicle body in an electrically independent manner;
    a second pipe connected electrically to the vehicle body; and
    a conductive clamp electrically connecting the fuel pipe with the second pipe;
    the conductive clamp being a unitary member which is flexible and formed of electrically conductive resin,
    the conductive clamp being supported by the feel pipe and the second pipe in such a manner that the entire conductive clamp is separate from and not in contact with the vehicle body allowing electrical charge to discharge at a location distant from the nonconductive clamp.

* * * * *

UNITED STATES PATENT AND TRADEMARK OFFICE
CERTIFICATE OF CORRECTION

PATENT NO. : 6,915,870 B2
DATED : June 12, 2005
INVENTOR(S) : Mitsuo Sugiyama et al.

Page 1 of 1

It is certified that error appears in the above-identified patent and that said Letters Patent is hereby corrected as shown below:

Column 5,
Line 48, change "a second pipe fixed to a the vehicle body" to -- a second pipe fixed to the vehicle body --.

Signed and Sealed this

Twenty-fourth Day of January, 2006

JON W. DUDAS
*Director of the United States Patent and Trademark Office*